(12) United States Patent
Chen et al.

(10) Patent No.: US 12,174,299 B1
(45) Date of Patent: Dec. 24, 2024

(54) GLARE DETECTION IN SENSOR DATA

(71) Applicant: Zoox, Inc., Foster City, CA (US)

(72) Inventors: Yongzhe Chen, San Jose, CA (US); Samuel Holladay, San Francisco, CA (US); Turhan Karadeniz, Oakland, CA (US); Ryan McMichael, Mountain View, CA (US); Subasingha Shaminda Subasingha, San Ramon, CA (US); Joseph Patrick Warga, San Francisco, CA (US); Harrison Thomas Waschura, Los Altos Hills, CA (US); Silas Kogure Wilkinson, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 978 days.

(21) Appl. No.: 17/123,579

(22) Filed: Dec. 16, 2020

(51) Int. Cl.
*G01S 17/89* (2020.01)
*G01S 17/10* (2020.01)
*G01S 17/894* (2020.01)
*G01S 17/931* (2020.01)
*G06T 7/246* (2017.01)
*G06T 7/521* (2017.01)
*B60W 30/09* (2012.01)

(52) U.S. Cl.
CPC ............ *G01S 17/894* (2020.01); *G01S 17/10* (2013.01); *G01S 17/931* (2020.01); *G06T 7/248* (2017.01); *G06T 7/521* (2017.01); *B60W 30/09* (2013.01); *B60W 2420/408* (2024.01); *G06T 2207/10028* (2013.01); *G06T 2207/10144* (2013.01); *G06T 2207/30252* (2013.01)

(58) Field of Classification Search
None
See application file for complete search history.

(56) References Cited

U.S. PATENT DOCUMENTS

| 3,676,003 | A  | * | 7/1972 | Naiman et al. | G01S 17/10 |
| | | | | | 398/161 |
| 6,289,282 | B1 | * | 9/2001 | Hassler | G01S 13/931 |
| | | | | | 701/96 |
| 9,677,986 | B1 | * | 6/2017 | Baldwin | G01S 7/481 |
| 10,436,899 | B2 | * | 10/2019 | Fukuman | G01S 15/931 |
| 10,928,479 | B2 | * | 2/2021 | Cohen | G01S 13/08 |
| 2018/0188129 | A1 | * | 7/2018 | Choudhury | G01N 21/85 |
| 2018/0290657 | A1 | * | 10/2018 | Ryne | B60W 10/20 |

* cited by examiner

*Primary Examiner* — Hovhannes Baghdasaryan
(74) *Attorney, Agent, or Firm* — Lee & Hayes, P.C.

(57) ABSTRACT

Techniques for determining a distance to an object in an environment based on sensor data are discussed herein. The sensor data can be captured by a sensor, and the sensor data can be based on laser pulses emitted from emitters being differently spaced apart from the sensor. The sensor data can be utilized to determine distance data associated with an object. A difference between the distance data can be used to determine whether the distance data is associated with a retroreflector. If the difference in distance data is above a threshold, a confidence level of sensor data can be adjusted or the sensor data can be discarded or omitted from subsequent processing.

20 Claims, 5 Drawing Sheets

GLARE DETECTION IN SENSOR DATA

BACKGROUND

Sensors, such as time-of-flight (ToF) sensors, may be unreliable in certain environments, including environments in which objects have high reflectivity. Moreover, because ToF sensors are often designed to detect objects in predetermined distance ranges, environments that include multiple objects at different distances may be difficult to interpret, e.g., due to ambiguity in the sensor returns. Such shortcomings may result in unreliable data, increased processing time to better understand the data, and/or decreased efficiency in identifying and/or characterizing objects that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for detecting glare in sensor data are discussed herein. In some examples, such glare may be caused by a retroreflector, such as a stop sign, and may be captured by a time-of-flight sensor of a vehicle. Sensor data can include data associated with an environment where multiple objects (e.g., pedestrians, vehicles, bicyclists, etc.) are located. In some examples, a time of flight (ToF) sensor can include first and second emitters that output laser light to be captured by a sensor to determine distance data between the sensor and an object in an environment. The ToF sensor may emit laser pulses from emitters being differently spaced apart from a sensor. Distance measurements determined using the different laser pulses can be compared. If a difference is above a threshold the distance measurement may be affected by stray light from a retroreflector, and a confidence value associated with the distance data can be downweighted or the distance data can be discarded. The techniques described herein may, in some instances, result in a better understanding of the environment of the vehicle, thereby leading to safer and/or more confident controlling of the vehicle.

As discussed herein, sensor data can be captured by one or more sensors integrated within, or separate from, a computing device of the vehicle. The one or more sensors can include ToF sensors, RADAR sensors, LIDAR sensors, SONAR sensors, image sensors, microphones, or any combination thereof. The computing device can include first and second emitters to emit a signal and a sensor to sense a return signal from the environment. Further, the computing device can comprise a sensor computing device to determine a data format of the captured sensor data.

In the context of a ToF sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can be associated with the pixels (e.g., an intensity and depth value for each pixel) in the sensor data. The computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, sensor data based on laser pulses emitted by one or more emitters in a ToF sensor can be captured by one or more sensors in the ToF sensor. For example, the emitter(s) can include multiple emitters that emit the laser pulses and that are differently spaced apart from a sensor. The sensor data received by the sensor can be utilized to determine distance data associated with the environment. A difference between the distance data associated with the sensor data captured by the multiple emitters can be determined. The difference can be utilized to determine whether the determined distance data is accurate.

In some examples, received light associated with one or more laser pulses emitted by a first emitter can be compared to received light associated with one or more laser pulses emitted by a second emitter. A difference between first distance data for sensor data captured based on a laser pulse emitted by the first emitter and second distance data for sensor data captured based on a laser pulse emitted by the second emitter can be determined. For example, the difference can include the first distance data associated with a first distance to an object being different from the second distance data associated with a second distance to the object. In various examples, a product of intensity and distance (or, otherwise, a product of intensity and a value associated with the phase angle) may be used a basis for comparison as opposed to the distance by itself. The difference can be utilized to determine whether a first pixel associated with the first distance and/or a second pixel associated with the second distance is associated with a retroreflector. By determining that the first pixel and/or the second pixel are associated with a retroreflector, the pixel data can be discarded and/or utilized to determine a confidence level associated with the first pixel or the second pixel. Of course, though discussed in detail as two distinct emitters, there may be more than two emitters and/or such emitters may be a single emitter with multiple emissions. In such examples which utilize a single emitter, an exposure time may be varied between such emissions.

In some examples, once distances to objects of the environment are determined according to the techniques described herein, the computing device of the vehicle may determine one or more trajectories for proceeding relative to the object(s). In some instances, depth and/or intensity information generated according to techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a single, configurable sensor, to more accurately determine features of the objects. By capturing image data at different sensor configurations, depth data can be disambiguated. For example, techniques described herein may be faster and/or more robust than conventional techniques, as they may increase the reliability of depth and/or intensity information, alleviating the need for successive images. That is, techniques described herein provide a technological improvement over existing object detection, classification, prediction and/or navigation technology. In addition to improving the accuracy with which sensor data can be used to determine objects and correctly characterize motion of those objects, techniques described herein can provide a smoother ride and improve safety outcomes by, for example, more accurately providing safe passage to an intended destination.

The techniques described herein can be implemented in a number of ways. Example implementations are provided below with reference to the following figures. Although applicable to vehicles, the methods, apparatuses, and systems described herein can be applied to a variety of systems and are not limited to vehicles. In another example, the techniques can be utilized in an aviation or nautical context, or in any system configure to input data to determine depth data associated with objects in an environment. Additionally, the techniques described herein can be used with real data (e.g., captured using sensor(s)), simulated data (e.g., generated by a simulator), or any third of the two.

Figure 1:
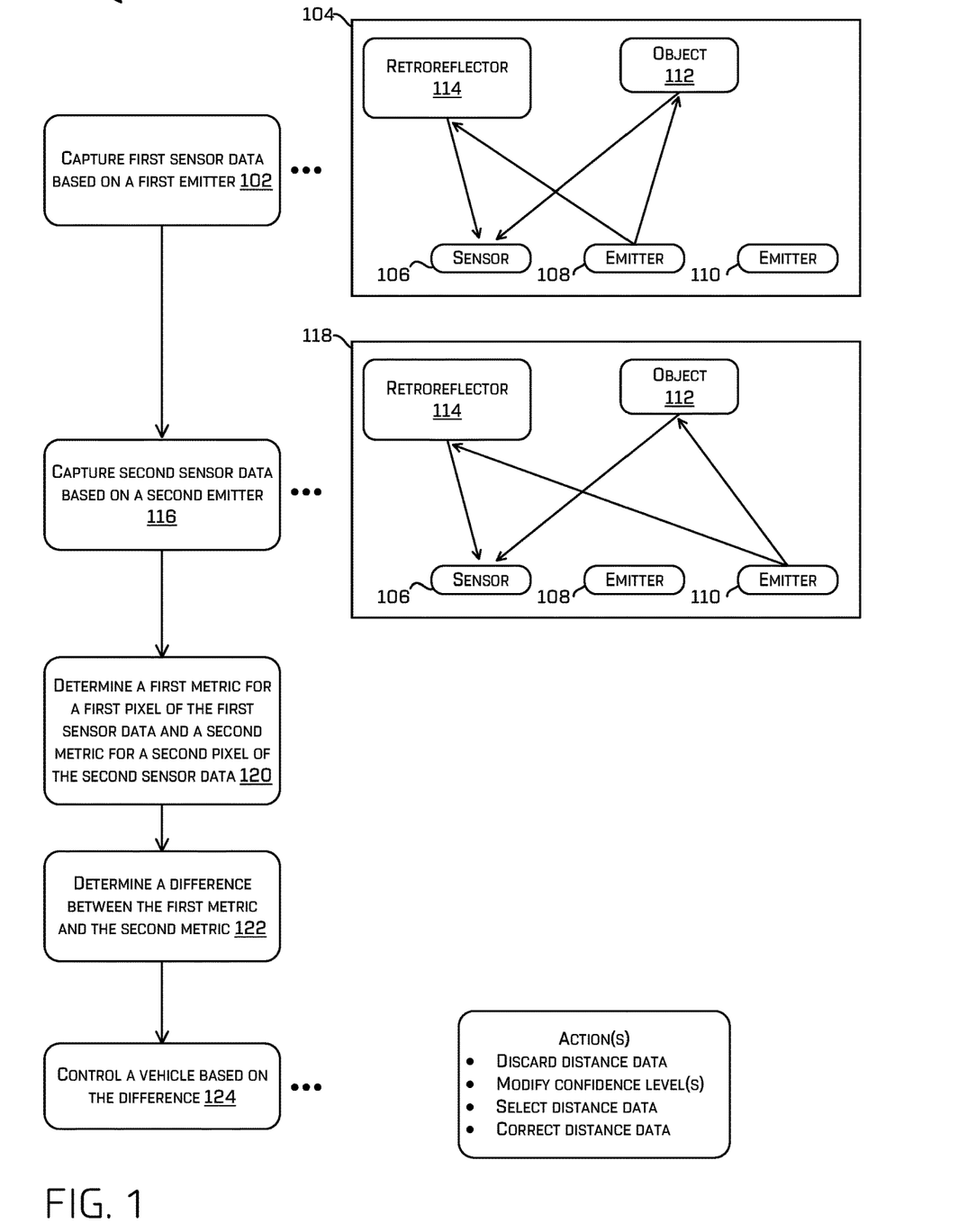
FIG. 1 is a pictorial flow diagram of an example process for determining glare in sensor data, in accordance with examples of the disclosure.
Figure 2:
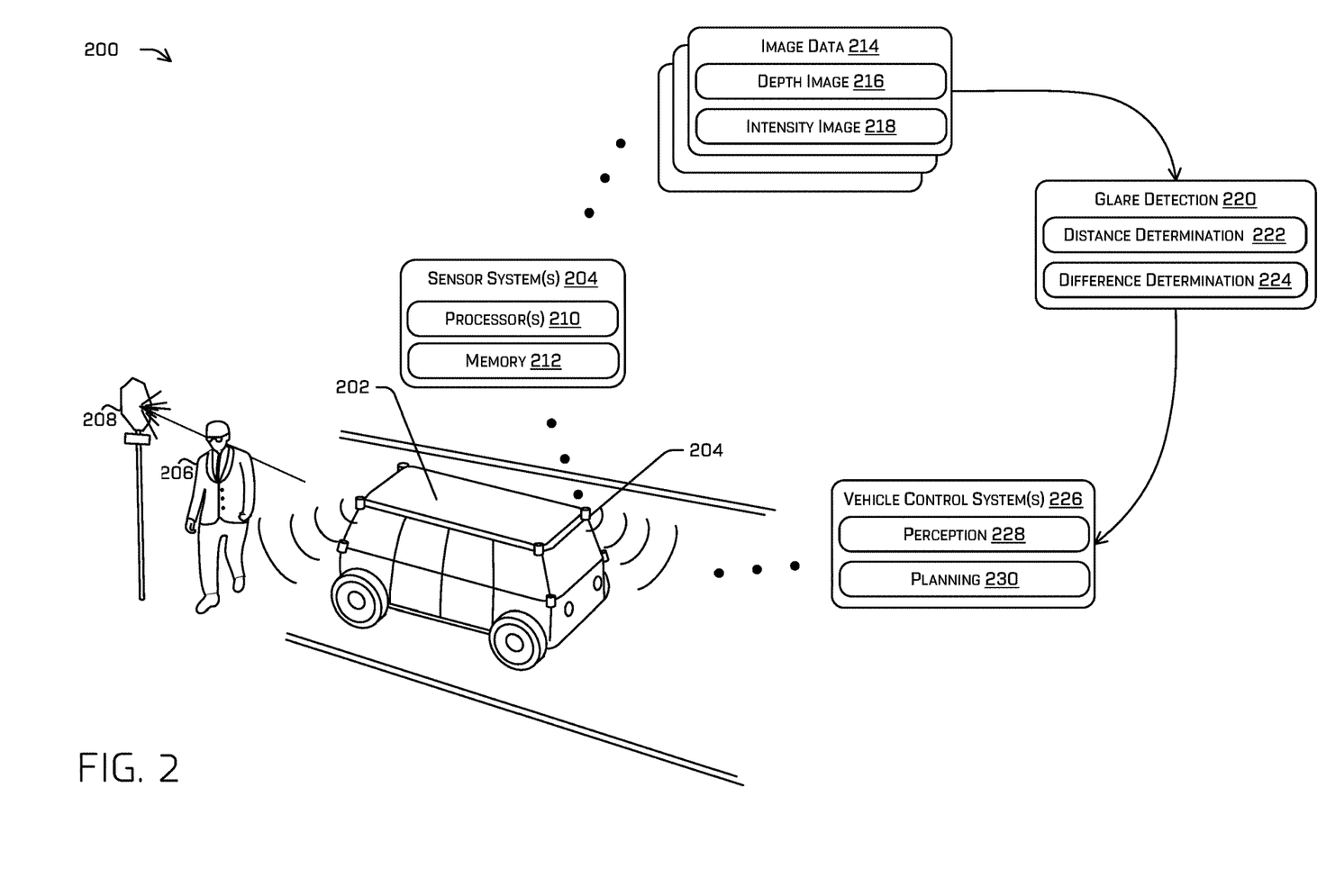
FIG. 2 illustrates an example environment and components of a vehicle, in accordance with examples of the disclosure.

FIG. 1 is a pictorial flow diagram of an example process for determining glare in sensor data, in accordance with examples of the disclosure. For example, the process 100 can be implemented using components and systems illustrated in FIG. 2 and described below, although the process 100 is not limited to being performed by such components and systems. Moreover, the components and systems of FIG. 2 are not limited to performing the process 100.

In more detail, the process 100 can include an operation 102 that includes capturing sensor data (e.g., first sensor data) based on a first emitter. As noted above, techniques described herein may be particularly applicable for use with time-of-flight (ToF) sensors, and the example of FIG. 1 may use ToF sensors as one specific example. The disclosure is not limited to use with ToF sensors, as techniques described herein may be applicable to other types of sensors that may be adversely affected by glare. In some examples, the first sensor data can be utilized by the ToF sensor to measure both distance data and intensity data. The first sensor data can be associated with a first exposure time associated with the first emitter.

An example 104 illustrates an environment including a sensor 106 that captures first sensor data based on a first emitter (e.g., an emitter 108). The sensor 106 can be differently spaced apart from the sensor 106 than a second emitter (e.g., an emitter 110). The sensor 106 can be spaced apart from the emitter 108 by a distance that is greater or less than a distance by which the sensor 106 is spaced apart from the emitter 110. For example, a difference between the distance by which the sensor 106 is spaced apart from the emitter 108 and the distance the sensor 106 is spaced apart from the emitter 110 can be greater than a threshold distance (e.g., 40 millimeters ("mm"), 80 mm, 120 mm, 160 mm, 200 mm, etc.). The emitter 108 can emit a first laser pulse, prior to the first sensor data being received. The emitter 110 can emit a second laser pulse, prior to the first sensor data being received.

In some cases, the first laser pulse can be associated with a first frequency. In some cases, the second laser pulse can be associated with a second frequency that is the same as or different than the first frequency.

The emitter 108 and the emitter 110 can be included in a same sensor pod of the ToF sensor. However, the emitter 108 and the emitter 110 are not limited to being in the same sensor pod, as techniques described herein may be applicable to other arrangements of emitters (e.g., emitters in different sensor pods, emitters in non-sensor pod arrangements, etc.).

In some examples, a position of each of the emitter 108 and the emitter 110 is on a same side of the sensor 106. In those examples, the emitter 108 and the emitter 110 can be positioned on a hypothetical line extending from the sensor 106, or skewed with one another (e.g., positioned on a same side of the sensor 106, but with the emitter 108 not being positioned on a hypothetical line extending from the sensor 106 to the emitter 110 (e.g., the sensor 106, the emitter 108, and the emitter 110 can be positioned in a checkerboard fashion).

The first sensor data can be captured by the sensor 106 based on light emitted by the emitter 108. For example, the first sensor data can be captured by the sensor 106 based on one or more laser light pulses (e.g., a first laser pulse) emitted by the emitter 108. The first laser pulse can be emitted by the emitter 108 into an environment (e.g., an area in a "field of view" of the ToF sensor, a portion of an area surrounding the ToF sensor, and/or a nearby area of the ToF sensor, etc.).

The first sensor data can be associated with light received by the sensor 106 based on the light emitted by the emitter 108. For example, the light can be received, as received light, based on the light emitted by the emitter 108 being reflected by one or more objects in the environment. The one or more objects can include an object 112 and a retroreflector 114. However, the received light is not limited to light received from the object 112 and the retroreflector 114 and can include light received from other object(s). In some cases, the received light can include light that is transmitted by the emitter 108, reflected off the object 112, and received by the sensor 106, as first light, and can include light that is transmitted by the emitter 108, reflected off the retroreflector 114, and received by the sensor 106, as second light.

In some examples, the sensor 106 can receive the first light as well as the second light, which can be associated with the light reflected off the retroreflector 114 due to highly reflective properties of the retroreflector 114. Because the first light and the second light are received by the sensor 106, the first sensor data captured by the sensor 106 can include data associated with the first light and data associated with the second light. In this example, the distance data can be determined for a first pixel of the first sensor data.

At operation 116, the process 100 can include capturing second sensor data based on a second emitter. In some examples, the second sensor data can be utilized by the ToF sensor to measure both distance data and intensity data. The second sensor data can be associated with a second exposure time associated with the second emitter, the second exposure time differing from the first exposure time. The second sensor data associated with the second exposure time can be captured based on light emitted from the second emitter being a same emitter as the first emitter from which light is received and utilized to captured the second sensor data associated with the second exposure time.

In some examples, the first sensor data can include sensor data of a first sensor type (e.g., a sensor type of the first sensor), and the second sensor data can be captured as part of additional sensor data of a second sensor type (e.g., a sensor type of the second sensor). The first sensor type can be the same as, or different from, the second sensor type.

An example 118 illustrates an environment including the sensor 106 that captures sensor data (e.g., second sensor data) based on the emitter 110. The sensor 106 can capture the second sensor data similarly as for the first sensor data based on the emitter 108. For example, the light by the sensor can include light that is transmitted by the emitter 110, reflected off the object 112, and received by the sensor 106, as first light, and can include light that is transmitted by the emitter 110, reflected off the retroreflector 114, and received by the sensor 106, as second light. The environment illustrated in example 118 can include the sensor 106, the emitter 108, the emitter 110, the object 112, and the retroreflector 114, which can be similar to (or the same as) the environment illustrated in example 104, as described above.

In some cases, the received light associated with the second sensor data can be similar to (or the same as), or different from, the received light associated with the first sensor data. For example, first light of the received light associated with the second sensor data can be similar to (or the same as), or different from, the first light and/or the second light of received light associated with the first sensor data; and second light of the received light associated with the second sensor data can be similar to (or the same as), or different from, the first light and/or the second light of received light associated with the first sensor data. The second sensor data associated with the emitter 110 can be similar to (or the same as) the first sensor data associated with the emitter 108, based on there being no glare from a retroreflector.

The second sensor data associated with the emitter 110 can be different from the first sensor data associated with the emitter 108, based on glare associated with the retroreflector 114. The second sensor data and the first sensor data can be different, based on the received light associated with the emitter 110 being different from the received light associated with the emitter 108. In some cases, received light associated with the emitter 110 can be different from the received light associated with the emitter 108, based on the second light (e.g., light reflected off the retroreflector 114) associated with the emitter 110 being different from the second light associated with the emitter 108.

In some examples, the first sensor data can be based on light emitted from one or both of the emitters 108 and 110 having a first intensity (aggregated or otherwise) and the second sensor data can be based on light emitted from one or both of the emitters 108 and 110 having a second intensity (aggregated or otherwise). For example, in capturing the first sensor data, the emitters 108 and 110 may emit light a full power, while in capturing the second sensor data, a power level of one or both of the emitters 108 and 110 can be varied such that the first (aggregated) intensity is different than the second (aggregated) intensity. That is, outputs of the emitters 108 and 110 can be used in any combination, and the techniques are not limited to binary on/off of emitters in a mutually exclusive manner. In some examples, a first intensity of emitted light from the first emitter is different than a second intensity of emitted light from the second emitter.

The first and/or the second intensity can be increased without impacting glare, due to the first and the second emitters being differently spaced apart from the sensor. In some examples, each of the first sensor data and the second sensor data can be based on light emitted from more than two emitters.

At operation 120, the process 100 can include determining a first metric (e.g., a first distance) for a first pixel of the first sensor data and a second metric (e.g., a second distance) for a second pixel of the second sensor data. For example, the first metric can be associated with distance data associated with a pixel location; and the second metric can be associated with the pixel location. The first metric can include a product of an intensity value at the pixel location, a depth value associated with the pixel location, and/or a value based at least in part on a phase angle associated with the pixel location. The second metric can be similar to (or the same as) as the first metric, except based on the second sensor data instead of the first sensor data. In some examples, the second metric can be determined based on a movement of a vehicle including the ToF sensor, the movement occurring between capturing the first sensor data and capturing the second sensor data.

In some cases, the first sensor data determined based on the received light associated with the emitter 108 can be utilized to determine the first distance. For example, the first distance can be associated with a distance to the object 112. In some cases, the second sensor data determined based on the received light associated with the emitter 110 can be utilized to determine the second distance. For example, the second distance can be associated with a distance to the object 112.

In some examples, the first pixel can be a same pixel as the second pixel. In other examples, the first pixel and the second pixel can be different pixels and can be associated with a same point associated with the image data. That is, the first pixel can correspond to coordinates (i, j) of the sensor and the second pixel can correspond to the same (i, j) coordinates of the sensor (although captured at a different time with varying light intensity from one or more emitters). In some examples, the first pixel and the second pixel can be associated with a same feature of the image data and may not correspond to the same sensor coordinates. In such an example, the second pixel can be determined based on motion of the sensor platform, object detection, motion parameters, and the like.

At operation 122, the process 100 can include determining a difference between the first metric (e.g., the first distance) and the second metric (e.g., the second distance). In some examples, the difference can be determined based on the second sensor data associated with the emitter 110 being different from the first sensor data associated with the emitter 108. The second sensor data may be different from the first sensor data, based on glare associated with the retroreflector 114 when such a difference meets or exceeds a threshold amount. The first distance data (e.g., a first distance) can be determined to be greater than the second distance data (e.g., a second distance). The second distance data can be set as a measured distance between the object 112 and the vehicle, based on the first distance data being greater than the first distance data. Of course, as above, other data received from the sensor may be used as a basis for comparison. As a non-limiting example, the product of intensity and distance per exposure may be compared (e.g., I*D), as well as the product of intensity and a value associated with the phase angle of the measurement ($Ie^{j\phi}$).

In some examples, the difference being determined to be above the threshold can be utilized to determine information associated with the sensor data. Based on the difference being determined to be above the threshold, discarding of data associated with the first pixel or the second pixel can be performed. Additionally or alternatively, determining a confidence level for the first pixel or the second pixel can be performed.

In some examples, determining a difference between the first distance and the second distance can include compensating for motion. The motion compensation can be associated with motion of a vehicle and can occur between capturing the first sensor data and capturing the second sensor data. In some examples, motion can be detected and compensated by optical flow, matching similar features between objects, inertial data of the vehicle and pose information of the sensor, etc.

While techniques as discussed above are oriented toward first and second pixels, they are not limited as such. In some examples, sensor data associated with regions of pixels of image data can be compared instead of sensor data associated with pixels. First sensor data associated with a first region can be compared to second sensor data associated with a second region. The regions can be separate regions or overlapping regions. By the comparing sensor data associated with the first and second regions, motion blur can be reduced and/or eliminated.

In some examples, at least one of the first distance data or the second distance data can be updated based on lidar data received by the vehicle. The difference can be determined based on the updated second sensor data and/or the updated first sensor data.

At operation 124, the process 100 can include controlling a vehicle based on the difference. The vehicle can include the ToF sensor, including the sensor 106, the emitter 108, and the emitter 110. In some examples, one or more actions based on the difference can be determined, the action(s) including discarding distance data, modifying one or more confidence levels, selecting distance data, and/or correcting distance data. The vehicle can be controlled based on the discarded distance data, the modified confidence level(s), the selected distance data, and/or the corrected distance data. However, controlling the vehicle is not limited to those actions, and the vehicle can be controlled based on other actions.

In some examples, distance data that is discarded can include the first distance and/or the second distance. By discarding distance data, distance data that is associated with a distance to the object being determined incorrectly can be discarded. Remaining distance data can be utilized to determine a more accurate distance associated with the object 112. The confidence level(s) that are modified can include a confidence level associated with the first pixel and/or a confidence level associated with the second pixel. By modifying the confidence level(s), one or more pixels that are affected by the glare due to the retroreflector, causing the distance data to be inaccurate, can be eliminated. The distance data that is selected can include the first distance data and/or the second distance data. The selected distance data can include distance data determined to be associated with an accurate distance to the object 112. By selecting the accurate distance data, a measurement of the distance to the object 112 can be performed with greater accuracy.

Therefore, and as described herein, a difference between first distance data determined based on a first emitter and second distance data associated with a second emitter can be determined. The difference may be due to glare associated with a retroreflector when such a difference meets or exceeds a threshold amount. The difference can be determined and utilized to more accurately determine a distance to an object in an environment including a retroreflector or remove a contribution of erroneous distance data from subsequent processing. The first emitter and the second emitter can be included along with a sensor in a ToF sensor. Other data received from the ToF sensor may be used as a basis for comparison. As a non-limiting example, the product of intensity and distance per exposure may be compared (e.g., I*D), as well as the product of intensity and a value associated with the phase angle of the measurement ($Ie^{j\theta}$).

First sensor data can be received by the ToF sensor based on light emitted from a first or second emitter, or both, having a first intensity (aggregated or otherwise). Second sensor data can be received by the ToF sensor based on light emitted from a first or second emitter, or both, having a first intensity (aggregated or otherwise). The intensity associated with the light being emitted can be maximized while reducing glare based on the first and second sensor data.

By determining the difference based on received light associated with a laser pulse emitted by the first emitter and received light associated with a laser pulse emitted by the second emitter, one or more actions can be determined. The action(s) can include discarding distance data, modifying one or more confidence levels, selecting distance data, and/or correcting distance data. The distance to the object can be determined notwithstanding glare associated with the retroreflector, based on the action(s). The vehicle can be controlled based on the distance to the object.

FIG. 2 illustrates an example environment and components of a vehicle, in accordance with examples of the disclosure. The example vehicle 202 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 202 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 202 can be any configuration of vehicle, such as, for example, a van, a sport utility vehicle, a cross-over vehicle, a truck, a bus, an agricultural vehicle, and/or a construction vehicle. The vehicle 202 can be powered by one or more internal combustion engines, one or more electric motors, hydrogen power, any combination thereof, and/or any other suitable power source(s). Although the example vehicle 202 has four wheels, the systems and methods described herein can be incorporated into vehicles having fewer or a greater number of wheels, tires, and/or tracks. The example vehicle 202 can have four-wheel steering and can operate generally with equal performance characteristics in all directions. For instance, the vehicle 202 may be configured such that a first longitudinal end of the vehicle 202 is the front end of the vehicle 202, and an opposite, second longitudinal end of the vehicle 202 is the rear end when traveling in a first direction, and such that the first end becomes the rear end of the vehicle 202 and the second end of the vehicle 202 becomes the front end of the vehicle 202 when traveling in the opposite direction. Stated differently, the vehicle 202 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 202 can be used to travel through an environment and collect data. For example, the vehicle 202 can include one or more sensor systems 204. The sensor system(s) 204 can be, for example, one or more time-of-flight (ToF) sensors, LiDAR sensors, RADAR sensors, SONAR sensors, image sensors, audio sensors, infrared sensors, location sensors, etc., or any combination thereof. Certain implementations described herein may be particularly well-suited for use with ToF sensors, although other types of sensors also are contemplated. The sensor system(s) 204 may be disposed to capture sensor data associated with the environment. For example, the sensor data may be processed by a vehicle control system to identify and/or classify one or more objects in the environment, e.g., trees, vehicles, pedestrians, buildings, road surfaces, signage, barriers, road marking, or the like and/or to navigate the vehicle 202 relative to such object(s). In some examples, the object(s) can include a pedestrian (e.g., an object 206) and a road sign (e.g., a stop sign (e.g., a retroreflector 208)).

As also illustrated in FIG. 2, the sensor system(s) 204 can include one or more processors 210 and memory 212 communicatively coupled to the processor(s) 210. The memory 212 can store processor-executable by the processor(s) 210 to cause the sensor system(s) 204 to perform functions that quantify glare and image data and/or correct the data to remove the impact of the glare, as detailed herein. The processor(s) 210 and/or the memory 212 may be physically integrated into the sensor system(s), e.g., as an SoC, FPGA, ASIC, or the like, or, in some implementations, the processor(s) 210 and/or the memory 212 may be available to, e.g., connected to receive signals from and/or send signals to, the sensor system(s) 204. As discussed above, the sensor system(s) 204 can determine the sensor data in various formats (e.g., a quadrature format, an intensity and depth format, and/or an unprojected format) using the processor(s) 210.

In the example of FIG. 2, the sensor system(s) 204 may include a ToF sensor, which may be configured to emit a carrier (e.g., a signal) and receive, e.g., capture, a response carrier (e.g., a response signal) comprising the carrier reflected off a surface in the environment. The ToF sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

As also illustrated in FIG. 2, the sensor system(s) 204 may be configured to output the sensor data, e.g., the intensity and depth information, the quadrature values, or the like, as image data 214. The image data 214 may be embodied as image frames. The image data 214 can include a stream of serially-generated (e.g., at a predetermined interval) image frames. Generally, each of the frames may include the same type of data, e.g., data related to the intensity and depth for each of a plurality of pixels comprising the receiver of the sensor. As illustrated in FIG. 2, the image data 214 can include a depth image 216 and an intensity image 218 generated by the sensor system(s) 204 and representative of a portion of the environment 200. Similarly, other instances, e.g., frames, of the image data 214 can include an intensity image and/or a depth image representative of the environment 200 at the corresponding sensing time.

As noted above, objects in the environment 200 may have different reflectively, and some highly reflective objects, e.g., retroreflectors (e.g., the retroreflector 208), can result in glare in the image data 214. Moreover, some less-reflective objects that are close to the sensor system(s) 204 can also result in image glare. In examples, glare may impact more than just the pixels associated with the highly reflective object. For instance, glare may impact substantially all pixels in the image data 214. Such impact may be visible in the image data 214 as ghosting or a haze. In some examples, glare can result in a relatively uniform error in both intensity and depth measurements. Glare may be read by the sensor as a depth that is generally related to the depth of the (reflective) surface causing the glare. Techniques described herein can correct for glare by quantifying the glare and adjusting measured depth and intensity based on the attributes of the glare. For example, the image data 214 corrected using the techniques described herein may better represent the environment and/or may have a higher associated confidence.

As illustrated in FIG. 2, a glare detection system 220 may be configured to receive the image data 214 generated by the sensor system(s) 204. In more detail, the glare detection system 220 can include a distance determination component 222 and a difference determination component 224. For clarity, the glare detection system 220 (and its components) are illustrated separate from the sensor system(s) 204 and from one or more vehicle control system(s) 230. However, portions of the glare detection system 220 may be implemented on one or both of the sensor system(s) 204 and/or the vehicle control system(s) 230. By way of non-limiting example, the processor(s) 210 may be configured to execute actions associated with the distance determination component 222 and/or the difference determination component 224.

The distance determination component 222 may be configured to determine whether received light associated with first sensor data based on a first emitter is different from received light associated with second sensor data based on a second emitter. Based on a difference between the received light associated with the first emitter and the received light associated with the second emitter, the distance determination component 222 can determine distances for one or more pixels of the sensor data. The distances can include a first distance for a first pixel of the first sensor data and a second distance for a second pixel of the second sensor data. In some cases, the first sensor data determined based on the received light associated with the emitter 108 can be utilized to determine the first distance. For example, the first distance can be associated with a distance to an object in the environment. In some cases, the second sensor data determined based on the received light associated with the emitter 110 can be utilized to determine the second distance. For example, the second distance can be associated with a distance to the object in the environment.

The difference determination component 224 can be configured to determine whether the pixel(s) have been influenced by glare. For example, the difference determination component 224 can determine whether a pixel (e.g., the first pixel or the second pixel, as described above in FIG. 1) has been influenced by glare based on a reported distance for each of the pixels. The reported distance(s) can be based on a linear combination of a distance of an object associated with the pixel and a distance to a retroreflector associated with the glare. Each of the distance to the object and the distance to the retroreflector can be weighted by a relative intensity of light received by the object and by the glare to the pixel. Equation (1) describes a product of a reported intensity and a reported distance:

$$I_{Reported}D_{Reported} = (D_{Object} \times I_{LightFromObject}) + (D_{Retroreflector} \times I_{LightFromRetroreflector}) \quad (1)$$

In Equation (1), $I_{Reported}$ is the reported intensity, e.g., from the intensity image 218 of the image data 214, $D_{Reported}$ is the reported distance, e.g., from the depth image 216 of the image data 214, $I_{LightFromRetroreflector}$ is the intensity attributable to glare (e.g., the glare intensity), $D_{Retroreflector}$ is the depth attributable to glare (e.g., the glare depth), $I_{LightFromObject}$ is the actual intensity of the object, e.g., the intensity that would be measured in the absence of glare, and $D_{Object}$ is the actual distance of the object, e.g., the distance that would be measured by the sensor in the absence of glare. As will be appreciated from Equation (1), when glare is present, the reported distance ($D_{Reported}$) is different from the actual distance of the object ($D_{Object}$). Accordingly, in the example in which glare is present in the image data 214 captured by the sensor system(s) 204 associated with the vehicle 202, glare can introduce error into determining where objects are relative to the vehicle 202. Such errors can result in unsafe operation of the vehicle 202. For instance, the difference between $D_{Reported}$ and $D_{Object}$ may be the difference between colliding with the object and avoiding a collision. Accordingly, aspects of this disclosure may be used to determine $D_{Object}$ (and $I_{LightFromObject}$), which can improve functioning of the vehicle 202.

In some examples, by capturing two images associated with a retroreflector, with each image being associated with a same $D_{Object}$ and a same $I_{LightFromObject}$, $I_{LightFromRetroreflector}$ may be different due to the glare from the retroreflector. Because the two images may be associated with different $I_{LightFromRetroreflector}$, $D_{Reported}$ will be different due to the glare associated with the retroreflector.

The difference determination component 224 can be configured to determine whether the pixel(s) have not been influenced by glare. For example, the difference determination component 224 can determine whether a pixel has not been influenced by glare based on a reported distance for the pixel. The reported distance for the pixel can be based on a linear combination of a distance of an object. The distance of the object can be weighted by a relative intensity of light received by the object. Equation (2) describes this reported distance:

$$I_{Reported}D_{Reported} = (D_{Object} \times I_{LightFromObject}) \quad (2)$$

In Equation (2), $I_{Reported}$ is the reported intensity, e.g., from the intensity image 218 of the image data 214, $D_{Reported}$ is the reported distance, e.g., from the depth image 216 of the image data 214, $I_{LightFromObject}$ is the actual intensity of the object, e.g., the intensity that would be measured in the absence of glare, and $D_{Object}$ is the actual distance of the object, e.g., the distance that would be measured by the sensor in the absence of glare. As will be appreciated from Equation (2), when no glare is present, the reported distance ($D_{Reported}$) and the actual distance of the object ($D_{Object}$) are a same distance.

In some examples, two captured images (e.g., an image associated with the first sensor data based on the emitter 108, and an image associated with the second sensor data based on the emitter 110, as described above in FIG. 1) can be determined to be determined to be associated with a retroreflector based on a $D_{Reported}$ associated with each image. By determining the two images are associated with a same $D_{Reported}$ based on the images not being associated with any $I_{LightFromRetroreflector}$ due to an absence of glare associated with the retroreflector, the two images can be determined to be associated with an environment with no retroreflector. By determining the two images are associated with a different $D_{Reported}$, based on each of the images being associated with an $I_{LightFromRetroreflector}$, due to a presence of glare associated with a retroreflector, the two images can be determined to be associated with an environment with the retroreflector.

As also illustrated in FIG. 2, the difference determination component 224 may be transmitted to the vehicle control system(s) 226, e.g., for use in controlling the vehicle 202. By way of non-limiting example, the vehicle control system(s) 226 can include a perception system 228 and a planning system 230. In examples, the perception system 228 may receive data from the difference determination component 224 and perform one or more of object detection, segmentation, and/or classification to determine objects in the data. The planning system 230 may determine a trajectory or route for the vehicle 202, e.g., relative to objects perceived by the perception system 230 based on the data received from difference determination component 224. As described herein, providing the vehicle control system(s) 228 with the data from the difference determination component 224 can improve safety outcomes, e.g., relative to providing the vehicle control system(s) 228 with the image data 214 impacted by glare.

Figure 3:
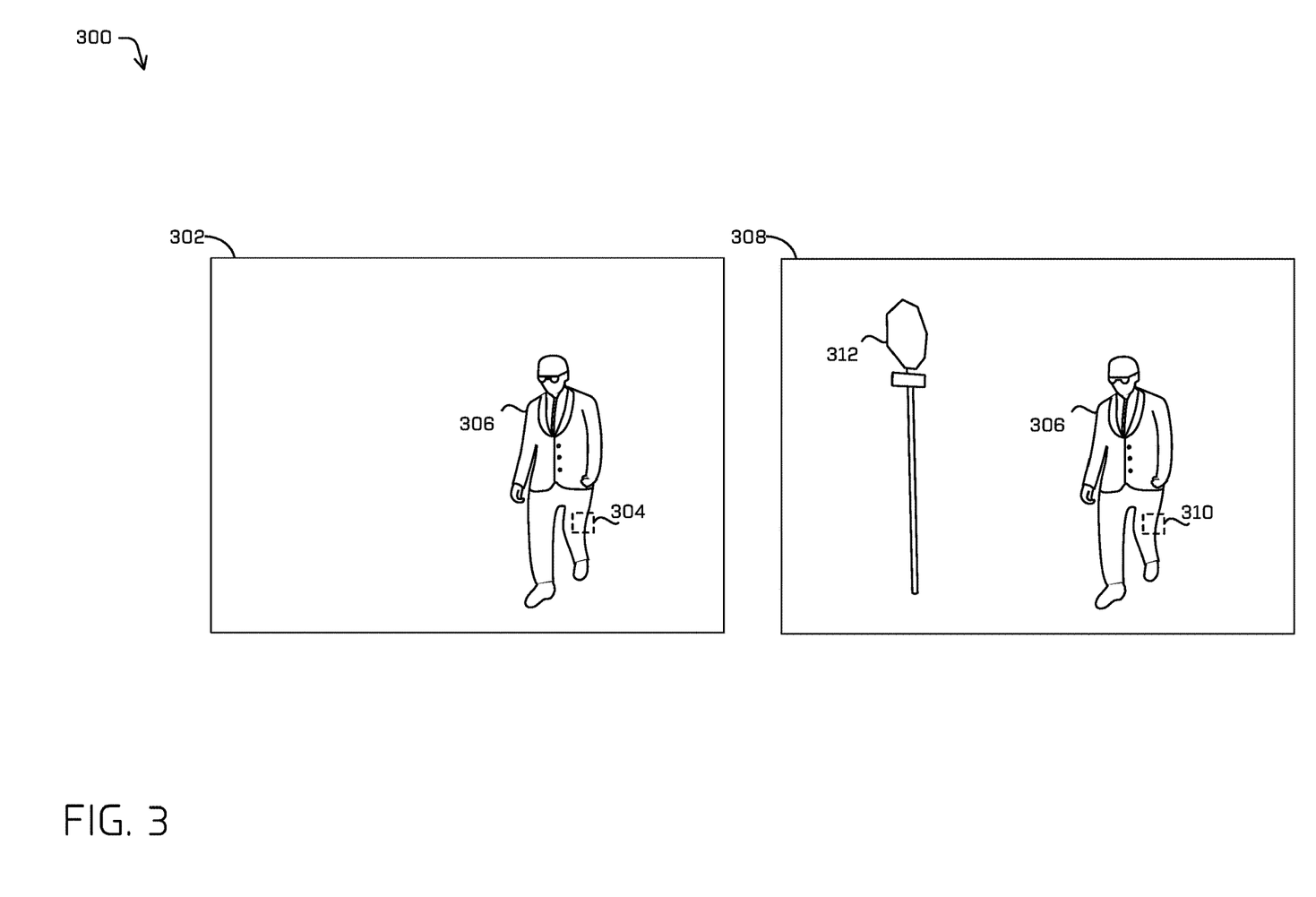
FIG. 3 illustrates example sensor data associated with an environment of a vehicle, the objects including a pedestrian and an object with high reflectivity, in accordance with examples of the disclosure.

FIG. 3 illustrates example sensor data 300 associated with an environment of a vehicle, in accordance with examples of the disclosure.

In some examples, the sensor data 300 includes an image frame 302 of a plurality of image frames associated with the sensor data 300. The image frame 302 includes data, e.g., data related to the depth information for each of a plurality of pixels. For example, as illustrated in FIG. 1, the image frame 302 includes a pixel 304 associated with depth data. The depth data can be associated with an object 306 in the environment. The depth data associated with the object 306 can be determined to be associated with the environment not including a retroreflector.

In some examples, first sensor data based on a first emitter (e.g., the emitter 108, as described above in FIG. 1), and second sensor data based on a second emitter (e.g., the emitter 110, as described above in FIG. 1) can be captured. Second distance data for the second sensor data associated with the emitter 110 and first distance data for the first sensor data associated with the emitter 108 may be a same distance data, based on the received light associated with the emitter 110 and the received light associated with the emitter 108 being a same received light. The second distance data based on the emitter 110 and the first distance data based on the emitter 108 may be determined to be associated the environment not including a retroreflector, due to the same distance data being determined.

In some examples, the sensor data 300 includes an image frame 308 of a plurality of image frames associated with the sensor data 300. The image frame 308 includes data, e.g., data related to the depth information for each of a plurality of pixels. For example, as illustrated in FIG. 1, the image frame 302 includes a pixel 310 associated with depth data. The depth data can be associated with the object 306 in the environment and a retroreflector 312. The depth data may be associated with the object 306 and the retroreflector 312, based on glare associated with the retroreflector 312.

In some examples, first sensor data based on a first emitter (e.g., the emitter 108, as described above in FIG. 1), and second sensor data based on a second emitter (e.g., the emitter 110, as described above in FIG. 1) can be captured. Second distance data for the second sensor data associated with the emitter 110 and first distance data for the first sensor data associated with the emitter 108 may be different distance data, based on the received light associated with the emitter 110 and the received light associated with the emitter 108 being different received light. The second distance data based on the emitter 110 and the first distance data based on the emitter 108 may be determined to be associated the environment including the retroreflector 312, due to the different distance data being determined.

Figure 4:
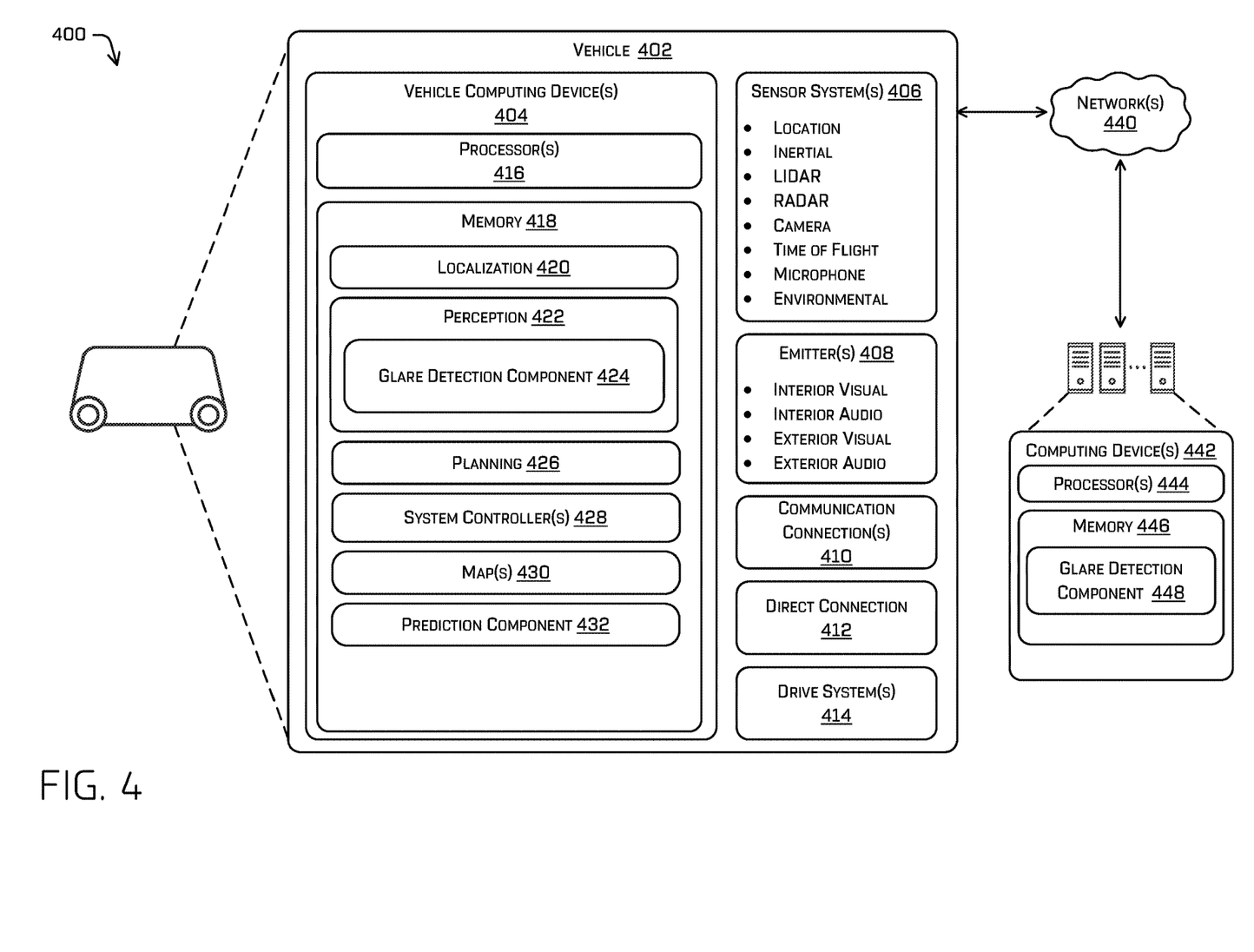
FIG. 4 depicts a block diagram of an example system for implementing the techniques described herein.

FIG. 4 depicts a block diagram of an example system 400 for implementing the techniques described herein. In at least one example, the system 400 can include a vehicle 402.

The vehicle 402 can include a vehicle computing device 404, one or more sensor systems 406, one or more emitters 408, one or more communication connections 410, at least one direct connection 412, and one or more drive systems 414.

The vehicle computing device 404 can include one or more processors 416 and memory 418 communicatively coupled with the one or more processors 416. In the illustrated example, the vehicle 402 is an autonomous vehicle; however, the vehicle 402 could be any other type of vehicle. In the illustrated example, the memory 418 of the vehicle computing device 404 stores a localization component 420, a perception component 422 comprising a glare detection component 424, a planning component 426, one or more system controllers 428, one or more maps 430, and a prediction component 432. Though depicted in FIG. 4 as residing in memory 418 for illustrative purposes, it is contemplated that the localization component 420, the perception component 422, the glare detection component 424, the planning component 426, the one or more system controllers 428, the one or more maps 430, and the prediction component 432 can additionally, or alternatively, be accessible to the vehicle 402 (e.g., stored remotely).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory and/or for generating map data, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some examples, the glare detection component 424 can include functionality to determine whether received light associated with first sensor data based on a first emitter is different from received light associated with second sensor data based on a second emitter. In some examples, two captured images (e.g., an image associated with the first sensor data based on the emitter 108, and an image associated with the second sensor data based on the emitter 110, as described above in FIG. 1) can be determined to be determined to be associated with a retroreflector based on distance data associated with each image. By determining the two images are associated with a same distance data based on received light, the two images can be determined to be associated with an environment with no retroreflector. By determining the two images are associated with different distance data based on received light, the two images can be determined to be associated with an environment with a retroreflector.

In general, the planning component 426 can determine a path for the vehicle 402 to follow to traverse through an environment. For example, the planning component 426 can determine various routes and trajectories and various levels of detail. For example, the planning component 426 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In at least one example, the vehicle computing device 404 can include one or more system controllers 428, which can be configured to control steering, propulsion, braking, safety, emitters, communication, and other systems of the vehicle 402. These system controller(s) 428 can communicate with and/or control corresponding systems of the drive system(s) 414 and/or other components of the vehicle 402.

The memory 418 can further include one or more maps 430 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like): spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 430 can include at least one map (e.g., images and/or a mesh). In some examples, the vehicle 402 can be controlled based at least in part on the maps 430. That is, the maps 430 can be used in connection with the localization component 420, the perception component 422, and/or the planning component 426 to determine a location of the vehicle 402, identify objects in an environment, and/or generate routes and/or trajectories to navigate within an environment.

In some examples, the one or more maps 430 can be stored on a remote computing device(s) (such as the computing device(s) 442) accessible via network(s) 440. In some examples, multiple maps 430 can be stored based on, for example, a characteristic (e.g., type of entity, time of day, day of week, season of the year, etc.). Storing multiple maps 430 can have similar memory requirements, but increase the speed at which data in a map can be accessed.

In general, the prediction component 432 can generate predicted trajectories of objects in an environment. For example, the prediction component 432 can generate one or more predicted trajectories for vehicles, pedestrians, animals, and the like within a threshold distance from the vehicle 402. In some instances, the prediction component 432 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 418 (and the memory 446, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 406 can include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 406 can include multiple instances of each of these or other types of sensors. For instance, the LIDAR sensors can include individual LIDAR sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally or alternatively, the sensor system(s) 406 can send sensor data, via the one or more networks 440, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In some examples, the vehicle 402 can send sensor data to one or more computing device(s) 442 via the network(s) 440. In some examples, the vehicle 402 can send raw sensor data to the computing device(s) 442. In other examples, the vehicle 402 can send processed sensor data and/or representations of sensor data to the computing device(s) 442. In some examples, the vehicle 402 can send sensor data to the computing device(s) 442 at a particular frequency, after a lapse of a predetermined period of time, in near real-time, etc. In some cases, the vehicle 402 can send sensor data (raw or processed) to the computing device(s) 442 as one or more log files.

The computing device(s) 442 can include processor(s) 444 and a memory 446 storing a glare detection component 448. In some instances, the glare detection component 448 can substantially correspond to the glare detection component 224 and can include functionality to determine a difference between different distance data, and determine whether pixel(s) have been influenced by glare.

The processor(s) 416 of the vehicle 402 and the processor(s) 444 of the computing device(s) 442 can be any suitable processor capable of executing instructions to process data and perform operations as described herein. By way of example and not limitation, the processor(s) 416 and 444 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 446 are examples of non-transitory computer-readable media. The memory 418 and 446 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 442 and/or components of the computing device(s) 442 can be associated with the vehicle 402. That is, the vehicle 402 can perform one or more of the functions associated with the computing device(s) 442, and vice versa.

Figure 5:
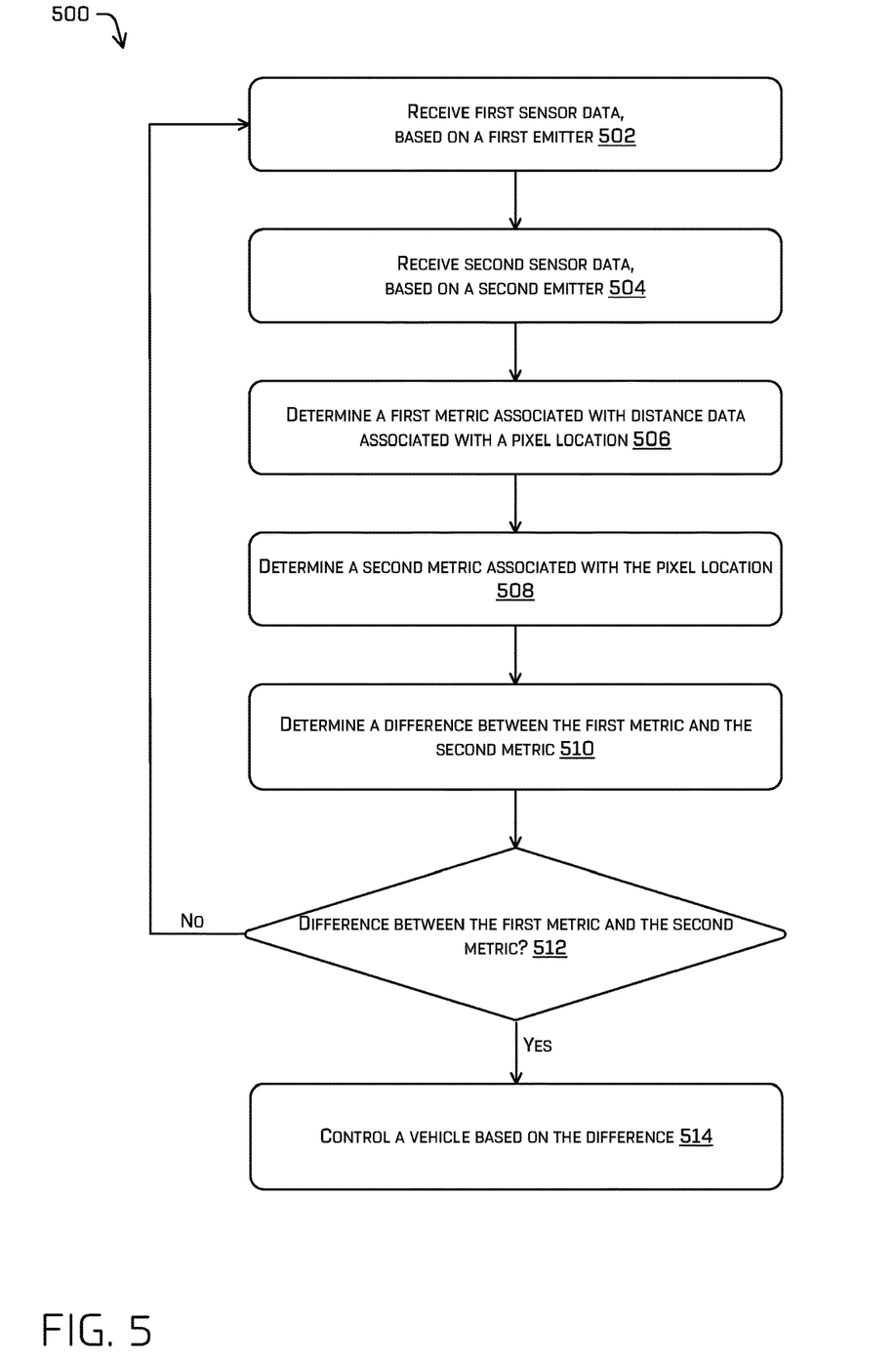
FIG. 5 is a flowchart depicting an example process for determining a difference between distance data associated with sensor data, and controlling a vehicle based on the difference, in accordance with examples of the disclosure.

FIG. 5 is a flowchart depicting an example process 500 for determining a difference between distance data associated with sensor data, and controlling a vehicle based on the difference, in accordance with examples of the disclosure.

By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 500.

At operation 502, the process may include receiving first sensor data, the first sensor data based on a first emitter. The first sensor data can be associated with light received by a sensor based on light emitted by the first emitter.

At operation 504, the process may include receiving second sensor data, the second sensor data based on a second emitter. The second sensor data can be associated with light received by the sensor based on light emitted by the second emitter.

At operation 506, the process can include determining first distance data for a first pixel of the first sensor data. The first sensor data determined based on the received light associated with the first emitter can be utilized to determine the first distance. The first distance can be associated with a distance to an object.

At operation 508, the process can include determining second distance data for a second pixel of the second sensor data. The second sensor data determined based on the received light associated with the second emitter can be utilized to determine the second distance. The second distance can be associated with a distance to an object.

At operation 510, the process can include determining a difference between the first distance data and the second distance data. The difference can be determined based on the second distance data for the second sensor data associated with the second emitter being different from the first distance data for the first sensor data associated with the first emitter.

At operation 512, the process can proceed to the operation 502, based on determining there is no difference between the first distance data and the second distance data. The process can proceed to the operation 514, based on determining there is a difference between the first distance data and the second distance data.

At operation 514, the process can include controlling a vehicle based on the difference. One or more actions based on the difference can be determined, the action(s) including discarding distance data, modifying one or more confidence levels, selecting distance data, and/or correcting distance data. The vehicle can be controlled (e.g., to follow a trajectory determined based on the distance data determined herein, such as to navigate around an object) based on the action(s) being determined.

EXAMPLE CLAUSES

A: A system comprising: one or more processors; and one or more non-transitory computer-readable media storing instructions executable by the one or more processors, wherein the instructions, when executed, cause the system to perform operations comprising: emitting, by a first emitter of a time of flight sensor, a first laser pulse into an environment: receiving, using a sensor of the time of flight sensor, first sensor data based on the first laser pulse: emitting, by a second emitter of the time of flight sensor, a second laser pulse into the environment: receiving, by the sensor of the time of flight sensor, second sensor data based on the second laser pulse: determining, based at least in part on the first sensor data, a first distance associated with a pixel location: determining, based at least in part on the second sensor data, a second distance associated with the pixel location: determining a difference between the first distance and the second distance; and controlling a vehicle based on the difference.

B: The system of paragraph A, the operations further comprising: determining that the difference is above a threshold; and performing at least one of: discarding data associated with a first pixel associated with the first sensor data or a second pixel associated with the second sensor data: or determining a confidence level for the first pixel or the second pixel.

C: The system of paragraph A or B, wherein the operations further comprise: determining, based at least in part on the difference, a presence of a retroreflector in the environment.

D: The system of any of paragraphs A-C, the operations further comprising: compensating for motion associated with the vehicle occurring between capturing the first sensor data and capturing the second sensor data.

E: The system of any of paragraphs A-D, wherein a first distance between the first emitter and the sensor is greater than a second distance between the second emitter and the sensor.

F: A method comprising: receiving first sensor data, the first sensor data based on a first emitter: receiving second sensor data, the second sensor data based on a second emitter: determining, based at least in part on the first sensor data, a first metric associated with distance data associated with a pixel location: determining, based at least in part on the second sensor data, a second metric associated with the pixel location: determining a difference between the first metric and the second metric; and controlling a vehicle based on the difference.

G: The method of paragraph F, wherein: the first emitter and the second emitter are a same emitter: the first sensor data is associated with a first exposure time; and the second sensor data is associated with a second exposure time differing from the first exposure time.

H: The method of paragraph F or G, wherein the first metric comprises a product of an intensity value at the pixel location and one or more of: a depth value associated with the pixel location, or a value based at least in part on a phase angle associated with the pixel location.

I: The method of any of paragraphs F-H, further comprising: determining, based at least in part on the difference meeting or exceeding a threshold difference, a presence of a retroreflector in an environment.

J: The method of any of paragraphs F-I, further comprising: determining a movement of the vehicle occurring between capturing the first sensor data and capturing the second sensor data; and determining the second metric based at least in part on the movement.

K: The method of any of paragraphs F-J, further comprising: based at least in part on the difference meeting or exceeding a threshold difference, at least one of: discarding data associated with a first pixel associated with the first sensor data or a second pixel associated with the second sensor data: or determining a confidence level for the first pixel or the second pixel.

L: The method of any of paragraphs F-K, wherein a first distance between the first emitter and a sensor capturing the first sensor data and the second sensor data is greater than a second distance between the second emitter and the sensor.

M: The method of paragraph L, wherein a first intensity of emitted light from the first emitter is different than a second intensity of emitted light from the second emitter.

N: The method of any of paragraphs F-M, further comprising: determining, based on the first sensor data, a first region of the first sensor data proximate the pixel location; and determining the first metric based on the first region of the first sensor data.

O: The method of any of paragraphs F-N, wherein: the first emitter emits a first laser pulse associated with a first frequency; and the second emitter emits a second laser pulse associated with a second frequency that is different than the first frequency.

P: The method of any of paragraphs F-O, wherein the first metric comprises a first distance and the second metric comprises a second distance, the method further comprising: determining that the first distance is greater than the second distance; and setting the second distance as a measured distance between an object and the vehicle based on the first distance being greater than the first distance.

Q: The method of any of paragraphs F-P, wherein the first sensor data comprises sensor data of a first sensor type, the method further comprising: receiving additional sensor data of a second sensor type; and updating at least one of the first metric or the second metric based on the additional sensor data.

R: One or more non transitory computer readable media storing instructions executable by a processor, wherein the instructions, when executed, cause the processor to perform operations comprising: receiving first sensor data, the first sensor data based on a first emitter: receiving second sensor data, the second sensor data based on a second emitter: determining, based at least in part on the first sensor data, a first metric associated with distance data associated with a pixel location: determining based at least in part on the second sensor data, a second metric associated with the pixel location: determining a difference between the first metric and the second metric; and controlling a vehicle based on the difference.

S: The one or more non transitory computer readable media of paragraph R, wherein: the first emitter and the second emitter are a same emitter; the first sensor data is associated with a first exposure time; and wherein the second sensor data is associated with a second exposure time differing from the first exposure time.

T: The one or more non transitory computer readable media of paragraph R or S, wherein the first metric comprises a product of an intensity value at the pixel location and one or more of: a depth value associated with the pixel location, or a value based at least in part on a phase angle associated with the pixel location.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer-readable media storing instructions executable by the one or more processors, wherein the instructions, when executed, cause the system to perform operations comprising:
emitting, by a first emitter of a time of flight sensor, a first laser pulse into an environment;
receiving, using a sensor of the time of flight sensor, first sensor data based on the first laser pulse and comprising a first plurality of pixels arranged as a first image;
emitting, by a second emitter of the time of flight sensor, a second laser pulse into the environment;

receiving, by the sensor of the time of flight sensor, second sensor data based on the second laser pulse and comprising a second plurality of pixels arranged as a second image;

determining, based at least in part on the first sensor data, a first distance associated with a pixel location of a first pixel of the first image;

determining, based at least in part on the second sensor data, a second distance associated with the pixel location of a second pixel of the second image, the second pixel corresponding to the same image coordinates as the first pixel;

determining that a first object associated with the first pixel is aligned with a second object associated with the second pixel;

determining a difference between the first distance and the second distance; and controlling a vehicle based on the difference.

2. The system of claim 1, the operations further comprising:
determining that the difference is above a threshold; and
performing at least one of:
discarding data associated with the first pixel or the second pixel; or
determining a confidence level for the first pixel or the second pixel.

3. The system of claim 1, wherein the operations further comprise:
determining, based at least in part on the difference, a presence of a retroreflector in the environment.

4. The system of claim 1, the operations further comprising:
compensating for motion associated with the vehicle occurring between capturing the first sensor data and capturing the second sensor data.

5. The system of claim 1, wherein the first distance is between the first emitter and the sensor, the second distance is between the second emitter and the sensor, and the first distance is greater than the second distance.

6. A method comprising:
receiving first sensor data based on a first emitter, the first sensor data comprising a first plurality of pixels arranged as a first image;
receiving second sensor data based on a second emitter, the second sensor data comprising a second plurality of pixels arranged as a second image;
determining, based at least in part on the first sensor data, a first metric associated with distance data associated with a pixel location of a first pixel of the first image;
determining, based at least in part on the second sensor data, a second metric associated with the pixel location of a second pixel of the second image, the second pixel corresponding to the same image coordinates as the first pixel;
determining that a first object associated with the first pixel is aligned with a second object associated with the second pixel;
determining a difference between the first metric and the second metric; and
controlling a vehicle based on the difference.

7. The method of claim 6, wherein:
the first emitter and the second emitter are a same emitter;
the first sensor data is associated with a first exposure time; and
the second sensor data is associated with a second exposure time differing from the first exposure time.

8. The method of claim 6, wherein the first metric comprises a product of an intensity value at the pixel location and one or more of:
a depth value associated with the pixel location, or
a value based at least in part on a phase angle associated with the pixel location.

9. The method of claim 6, further comprising:
determining, based at least in part on the difference meeting or exceeding a threshold difference, a presence of a retroreflector in an environment.

10. The method of claim 6, further comprising:
determining a movement of the vehicle occurring between capturing the first sensor data and capturing the second sensor data; and
determining the second metric based at least in part on the movement.

11. The method of claim 6, further comprising:
based at least in part on the difference meeting or exceeding a threshold difference, at least one of:
discarding data associated with the first pixel or second pixel; or
determining a confidence level for the first pixel or the second pixel.

12. The method of claim 6, wherein a first intensity of emitted light from the first emitter is different than a second intensity of emitted light from the second emitter.

13. The method of claim 6, further comprising:
determining, based on the first sensor data, a first region with a group of a plurality of pixels associated with the first sensor data, the group of the plurality of pixels being nearer to the pixel location than remaining ones of the plurality of pixels; and
determining the first metric based on the first region.

14. The method of claim 6, wherein:
the first emitter emits a first laser pulse associated with a first frequency; and
the second emitter emits a second laser pulse associated with a second frequency that is different than the first frequency.

15. The method of claim 6, wherein the first metric comprises a first distance and the second metric comprises a second distance, the method further comprising:
determining that the first distance is greater than the second distance; and
setting the second distance as a measured distance between an object and the vehicle based on the first distance being greater than the first distance.

16. The method of claim 6, wherein the first sensor data comprises sensor data of a first sensor type, the method further comprising:
receiving additional sensor data of a second sensor type; and
updating at least one of the first metric or the second metric based on the additional sensor data.

17. One or more non-transitory computer-readable media storing instructions executable by a processor, wherein the instructions, when executed, cause the processor to perform operations comprising:
receiving first sensor data based on a first emitter, the first sensor data comprising a first plurality of pixels arranged as a first image;
receiving second sensor data based on a second emitter, the second sensor data comprising a second plurality of pixels arranged as a second image;
determining, based at least in part on the first sensor data, a first metric associated with distance data associated with a pixel location of a first pixel of the first image;

determining based at least in part on the second sensor data, a second metric associated with the pixel location of a second pixel of the second image, the second pixel corresponding to the same image coordinates as the first pixel;

determining that a first object associated with the first pixel is aligned with a second object associated with the second pixel;

determining a difference between the first metric and the second metric; and controlling a vehicle based on the difference.

18. The one or more non-transitory computer-readable media of claim 17, wherein:

the first emitter and the second emitter are a same emitter;

the first sensor data is associated with a first exposure time; and wherein the second sensor data is associated with a second exposure time differing from the first exposure time.

19. The one or more non-transitory computer-readable media of claim 17, wherein the first metric comprises a product of an intensity value at the pixel location and one or more of:

a depth value associated with the pixel location, or a value based at least in part on a phase angle associated with the pixel location.

20. The system of claim 1, wherein:

a first portion of the first sensor data represents the first object, and a second portion of the second sensor data represents the second object;

determining the first distance further comprises determining, based at least in part on the first sensor data, the first distance to the first object, determining the second distance further comprises determining, based at least in part on the second sensor data, the second distance to the second object, and determining the difference further comprises determining, based on the first object being represented in the first portion of the first sensor data and the second object being represented in the second portion of the second sensor data, the difference between the first distance and the second distance.

* * * * *